(12) United States Patent
Plougmann et al.

(10) Patent No.: US 12,406,309 B1
(45) Date of Patent: Sep. 2, 2025

(54) AUTO FILING OF INSURANCE CLAIM VIA CONNECTED CAR

(71) Applicant: UIPCO, LLC, San Antonio, TX (US)

(72) Inventors: Lars Plougmann, Austin, TX (US); Sumita T. Jonak, San Antonio, TX (US); Ross Andrew Thiele, San Antonio, TX (US); Chris Clark, San Antonio, TX (US); Joshua Hiram Gutierrez, Pearland, TX (US); Felix Gutierrez, San Antonio, TX (US); Dallin C. Wilcox, San Antonio, TX (US); Will Kerns Maney, Jr., New York City, NY (US); Michael P Bueche, Jr., San Antonio, TX (US); Remington Luke Williams, Bulverde, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 101 days.

(21) Appl. No.: 17/823,826

(22) Filed: Aug. 31, 2022

Related U.S. Application Data

(60) Provisional application No. 63/238,926, filed on Aug. 31, 2021.

(51) Int. Cl.
| | |
|---|---|
| *G06Q 20/32* | (2012.01) |
| *G06F 9/451* | (2018.01) |
| *G06F 16/23* | (2019.01) |
| *G06F 21/53* | (2013.01) |
| *G06Q 20/10* | (2012.01) |

(Continued)

(52) U.S. Cl.
CPC ............. *G06Q 40/08* (2013.01); *G07C 5/008* (2013.01); *G07C 5/08* (2013.01)

(58) Field of Classification Search
CPC .......... G06Q 40/08; G07C 5/008; G07C 5/08
See application file for complete search history.

(56) References Cited

U.S. PATENT DOCUMENTS 9,773,281 B1 * 9/2017 Hanson ................. H04W 4/023
10,994,727 B1 * 5/2021 Kumar ............... G06Q 30/0213
(Continued)

OTHER PUBLICATIONS

Q. Wang et al., "A Precision Acceleration Determination Method Based on Combining GPS Carrier Phase and Doppler," 2011, Procedia Engineering 16 (2011) 737-744, International Workshop on Automobile, Power and Energy Engineering, Elsevier, SciVerse ScienceDirect (Year: 2011).*

*Primary Examiner* — Jessica Lemieux
*Assistant Examiner* — Douglas W Pinsky
(74) *Attorney, Agent, or Firm* — Plumsea Law Group, LLC

(57) ABSTRACT

A vehicle connected to an insurance provider includes: a sensor configured to collect sensor information about the vehicle; a control center connected to the sensor and configured receive the sensor information from the sensor, to detect an event using the sensor information, wherein the event includes a classification, and to transmit the sensor information and an indication of the event to the insurance provider; a claims processing module connected to the control center and configured to generate, upon detection of the event, a claim with the insurance provider using the sensor information; and an indicator configured to indicate a classification of the sensor information.

8 Claims, 11 Drawing Sheets

(51) Int. Cl.

| | | |
|---|---|---|
| *G06Q 20/34* | (2012.01) | |
| *G06Q 20/36* | (2012.01) | |
| *G06Q 20/38* | (2012.01) | |
| *G06Q 20/40* | (2012.01) | |
| *G06Q 40/06* | (2012.01) | |
| *G06Q 40/08* | (2012.01) | |
| *G07C 5/00* | (2006.01) | |
| *G07C 5/08* | (2006.01) | |
| *H04L 29/06* | (2006.01) | |
| *H04W 12/06* | (2021.01) | |
| *H04W 12/08* | (2021.01) | |
| *G06F 21/31* | (2013.01) | |
| *G06F 21/32* | (2013.01) | |
| *G06F 21/45* | (2013.01) | |
| *G06F 21/57* | (2013.01) | |
| *G06Q 40/02* | (2023.01) | |
| *H04W 4/14* | (2009.01) | |
| *H04W 12/062* | (2021.01) | |
| *H04W 12/72* | (2021.01) | |
| *H04W 60/00* | (2009.01) | |

(56) References Cited

U.S. PATENT DOCUMENTS

| | | | |
|---|---|---|---|
| 11,203,314 B2* | 12/2021 | Levy | H04M 1/72418 |
| 2002/0103622 A1* | 8/2002 | Burge | G16Z 99/00 |
| | | | 702/183 |
| 2017/0089710 A1* | 3/2017 | Slusar | G06V 20/58 |
| 2018/0225769 A1* | 8/2018 | Slusar | G06Q 50/40 |
| 2019/0039545 A1* | 2/2019 | Kumar | G05D 1/228 |
| 2019/0066225 A1* | 2/2019 | Thompson | G06N 7/01 |
| 2019/0244301 A1* | 8/2019 | Seth | G06F 16/73 |
| 2020/0267503 A1* | 8/2020 | Watkins | H04W 4/027 |
| 2021/0056315 A1* | 2/2021 | Kale | G06V 20/56 |
| 2023/0035340 A1* | 2/2023 | Rose | G06N 20/00 |
| 2023/0070094 A1* | 3/2023 | Hanson | G06Q 40/08 |
| 2023/0136253 A1* | 5/2023 | Seth | G06Q 40/08 |
| | | | 705/4 |
| 2023/0177616 A1* | 6/2023 | Thurber | G06Q 50/163 |
| | | | 705/4 |
| 2023/0260049 A1* | 8/2023 | Brandmaier | G08G 1/205 |
| | | | 280/729 |

* cited by examiner

AUTO FILING OF INSURANCE CLAIM VIA CONNECTED CAR

CROSS-REFERENCE TO RELATED APPLICATIONS

This application claims the benefit of U.S. Provisional Patent Application Ser. No. 63/238,926, filed on Aug. 31, 2021, for "Auto Filing of Insurance Claim Via Connected Car," the entirety of which is hereby incorporated by reference.

TECHNICAL FIELD

The present disclosure relates to a vehicle that is capable of automatically filing an insurance claim, and more specifically to a connected vehicle that gathers information using sensors when an accident occurs and provides such information to an insurance provider. The insurance provider may then generate and process a claim. The insurance provider may also provide information to the vehicle to instruct a driver or passenger of the vehicle as to how to react to the accident.

BACKGROUND

A user of a vehicle may encounter a number of problems when a traffic accident occurs. One or more of these problems, such as ensuring the safety of occupants of the vehicle, may require immediate attention. In a typical situation, the user involved with the traffic accident will need to contact an insurance company to initiate an insurance claim responsive to the accident. For example, the user involved in the traffic accident may need to take steps to specifically contact the insurance provider and provide the insurance provider with information about the traffic accident.

This situation is problematic. For example, it may be inconvenient for the user to provide extensive identifying and account information. Moreover, the user may not have access to information collected by the vehicle. In addition, the user's health may be negatively affected by the traffic accident. The user may thus not be fully capable of communicating with the insurance provider.

There is a need in the art for a system and method that addresses the shortcomings discussed above.

SUMMARY

In one aspect, a vehicle connected to an insurance provider includes: a sensor configured to collect sensor information about the vehicle; a control center configured to receive the sensor information collected by the sensor, to detect, using the sensor information, an event; and a claims processing module configured to receive the sensor information and to generate a claim with the insurance provider using the sensor information upon detection of the event.

In another aspect, a vehicle includes: a sensor configured to collect sensor information about the vehicle; a control center connected to the sensor and configured receive the sensor information from the sensor, to classify the sensor information; and an indicator configured to visually indicate a classification of the sensor information.

In yet another aspect, a vehicle connected to an insurance provider includes: a sensor configured to collect sensor information about the vehicle; a control center connected to the sensor and configured receive the sensor information from the sensor, to detect an event using the sensor information, wherein the event includes a classification, and to transmit the sensor information and an indication of the event to the insurance provider; a claims processing module connected to the control center and configured to generate, upon detection of the event, a claim with the insurance provider using the sensor information; and an indicator configured to indicate a classification of the sensor information.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
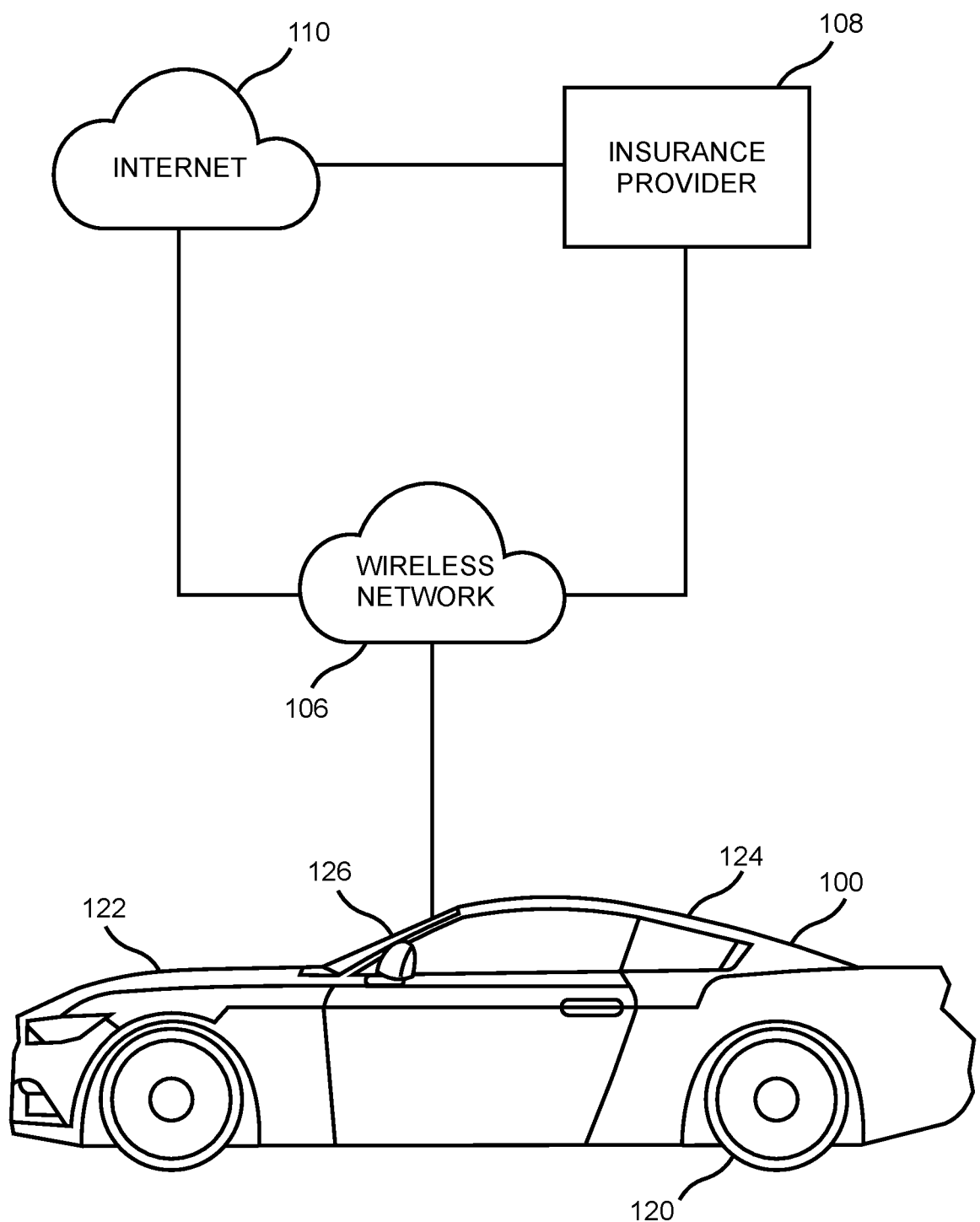
FIG. 1 is a schematic view of a connected vehicle interacting with an insurance provider, according to an embodiment.

Embodiments include improved systems and methods for a vehicle to automatically initiate an insurance claim. For example, as a user drives a vehicle, an accident occurs. In the following discussion, the term "user" refers to either a driver of a vehicle involved in an accident or a passenger of such a vehicle, "driver" refers specifically to a driver, and a "passenger" refers specifically to a passenger other than the driver.

It is to be noted that, with respect to insurance products and an insured event, a driver, a passenger, or another party or entity may be a policyholder associated with the insured event. Thus, an insurance product covering the vehicle may be associated with the vehicle's owner rather than a driver or a passenger. In this case, an insurance claim on the insurance product may be associated with a policyholder other than the driver or passenger, but the insurance claim may still be of value to the driver or passenger who may need access to information about the insurance claim, such as if the driver and/or passenger requires medical treatment.

Non-limiting examples of insured events include head-on collisions, highway construction accidents, intersection accidents, interstate accidents, rear-end collisions, side-impact collisions, damage caused by falling trees, and fires. In general, a car accident may include a collision with another vehicle, a collision with a human or an animal, or a collision with a static object. However, a car accident may also include an incident where a car departs a roadway, or other incidents that interfere with the user's ability to drive.

Accidents may occur for a variety of reasons. For example, accidents may occur due to distracted driving, texting-while-driving, drowsy driving, drugged driving, drunk driving, speeding, or reckless driving, as examples of negligent causes for accidents. With respect to fault, these non-limiting examples involve fault on the part of an impaired or careless driver and mean that the impaired or careless driver is entirely or partially at fault for the accident. For example, a driver who ignores the rules of the road, such as by failing to yield or ignoring a traffic signal, may cause an accident with another vehicle whose driver is not at fault or who has a lesser responsibility.

However, accidents may also occur for reasons where a party is not at fault. For example, a driver may be struck by another driver who is impaired as discussed above. Also, other factors may cause an accident to occur without fault, such as mechanical failure or an unanticipated medical event, such as if a driver has a stroke or heart attack. In general, when a driver is at fault the accident is due to negligent or reckless choices that were under the control of the driver, whereas a driver is not at fault, or responsibility is reduced, if the accident occurred due to factors beyond the driver's control.

According to some embodiments, a system may gather information about a user's driving, either at the time of an accident, or during a time window including the time of the accident, as well as a time window before and/or after the accident. Gathering such information may provide greater details about how the accident occurred. For example, if the brakes failed, it may be helpful to establish that this contributed to the accident.

An insurance provider with an obligation to cover a damaged vehicle or other insured event may wish to determine an extent to which the driver was at fault. Based on this determination, the insurance provider may decide to change a user's premium or no longer cover the user or the user's vehicle. Thus, having a record based on information from the vehicle may be valuable to the user and the insurance provider in apportioning liability. For example, the insurance provider and the driver may have evidence to establish the fault of a third party. By having a record of what occurred during the accident, it is possible to help assess what the driver's contribution to the accident was, so liability may be fairly allocated.

Once an accident occurs, a connected vehicle may automatically notify an insurance provider of the accident. For example, the connected vehicle may notify the insurance provider of various information related to the accident. In addition to an indication that an accident has occurred, the connected vehicle may notify the insurance provider of the deployment of an airbag or a measure of deceleration experienced by the vehicle and its occupants. The connected vehicle may provide other information to the insurance provider so that the insurance provider may automatically generate and process a claim and make decisions about the disposition of the vehicle, as discussed further below. Such information may include additional information about the circumstances of the accident, about the participants in the accident, and about a condition of the vehicle.

Automatically generating an insurance claim may be helpful for a number of reasons. In one example, by automating the generation process, it is more convenient for a user. In another case, as discussed above, a traffic accident may injure, traumatize, or otherwise distract a user involved in the accident. Accordingly, the user may not be able to make the claim themselves. Automatically filing the claim may help manage this situation.

Even if the user would be otherwise capable of contacting the insurance company, the user may have more pressing concerns, such as responding to the medical needs or safety of themselves or another participant in the accident. Also, as discussed above, by automatically generating a claim, it may be possible to gather an objective, unbiased account of what has happened during an accident to assess fault and determine liability. The user or policy holder may contact the insurance provider at a later time to provide additional information or otherwise augment the claim.

Additionally, by automating the process of generating a claim, embodiments not only increase the user's convenience, but may automate sending emergency assistance to the user, directing the user to take actions to effectively handle the accident, and make early decisions about the disposition of covered vehicles, as discussed further below. For example, embodiments may instruct a user to exchange identification/insurance information with other parties in the accident or may instruct emergency crews about the condition of the vehicle and the preferred handling of the vehicle. As the user may be distracted by the accident, providing instructions about how to proceed may be helpful to reduce decision making burdens on a user.

According to some embodiments, the system may also contact emergency assistance. For example, emergency assistance may include police, fire, or medical assistance, as non-limiting examples. Moreover, when contacting emergency assistance, embodiments may choose a most helpful form of emergency assistance. For example, embodiments may contact a fire department if a vehicle in an accident is on fire or contact an ambulance with paramedics or emergency medical technicians if a user is injured.

In addition to indicating the mere occurrence of the accident, the connected vehicle may provide additional information, such as the location of the accident, the current condition of the vehicle and conditions experienced by the vehicle. For example, the connected vehicle may use a GPS sensor or another location sensor to ascertain the location of the connected vehicle and may inform the insurance provider of the location of the connected vehicle. Other additional sensors and the information they provide are discussed further, below.

Modern vehicles are typically equipped with sensors and "black-box" style recording devices that retain recent sensor readings. For example, the sensors may read information at a particular point in time or may maintain a window of recent sensor readings. Further examples of such sensors are provided in FIGS. 2-3. For example, a vehicle may track its speed and/or acceleration at a particular immediate point in time and may also track this data for a time period before a present time. For example, the sensors may maintain a record of a car's motion over a certain interval, for example three to ten minutes, though other intervals may be used and the interval is not limited to three to ten minutes. One goal of maintaining such a record is to make data available about the vehicle immediately prior to, during, and/or after an accident. For example, the sensors may continue to gather information even after an accident has occurred.

It may be helpful to have sensor information gathered in a window prior to the accident because it may establish a proximate cause of the accident and otherwise help categorize the accident. It may be helpful to have sensor information gathered in a window after the accident because it may help clarify the aftermath of the accident in a way that helps clarify appropriate follow-up processes, to allocate liability, and provide any necessary emergency response.

In some embodiments, the vehicle may also feature a way to connect to information technology (IT) interfaces via a built-in communications capability. Example communications capabilities include satellite and cellular network communications. Some automakers allow access to data collected by a vehicle via an application programming interface (API). Accordingly, an owner of a vehicle may access the collected data and may authorize third parties to access the collected data.

FIG. 1 is a schematic view of a connected vehicle interacting with an insurance provider, according to an embodiment. FIG. 1 is a schematic view of an illustrative embodiment of a vehicle 100 having various communications and computer resources, a wireless network 106, referred to as wireless network 106, and an insurance provider 108. The wireless network 106 may be any kind of wireless network, including but not limited to any cellular telephone network using, for example, any one of the following standards: CDMA, TDMA, GSM, AMPS, PCS, analog, and/or W-CDMA. Other wireless technologies are also possible, such as various types of 3G, 4G LTE, and 5G NR technologies, and in certain applications, local wireless technologies such as BLUETOOTH and Wi-Fi. Thus, as vehicle 100 moves around, the wireless network 106 provides the vehicle 100 with communication capabilities. Hence, when the vehicle 100 is in an accident, the vehicle 100 can use the wireless network 106 to transmit the same, as discussed further, below. Moreover, the vehicle 100 can track information on an ongoing basis, providing information that may indicate the context of an accident. For example, anti-lock brake sensors or rain sensors of the vehicle 100 may be used to sense reduced traction indicative of poor weather, which may be logged by the vehicle 100 to provide warning that accidents are more likely and it may be valuable to have a response prepared.

In some embodiments, the insurance provider 108 communicates with the vehicle 100. In FIG. 1, the insurance provider 108 corresponds to a computer system of an insurance provider, and specifically an insurance provider with an obligation to cover an event involving the vehicle 100. However, the insurance provider 108 may also be a health insurance provider or an automobile or vehicle club, and the present embodiments will still apply.

The wireless network 106 may be used to facilitate communications between the insurance provider 108 and the vehicle 100, using communication technologies as discussed above. The insurance provider 108 can communicate with the wireless network 106 in a number of different ways. In some embodiments, the insurance provider 108 communicates with the wireless network 106 wirelessly. In other embodiments, the insurance provider 108 is directly connected to one or more elements of the wireless network 106, and in still other embodiments, the insurance provider 108 communicates with the wireless network 106 using the Internet 110. In some embodiments, the insurance provider 108 can use more than one method of communicating with the wireless network 106 or use other methods as back-ups. Part of the communication may involve wired connections, as appropriate.

In the example of FIG. 1, the vehicle 100 also includes at least one wheel 120 adapted to support the vehicle 100, an engine 122, a body or chassis 124, and a passenger cabin 126, which is adapted to accommodate at least one human passenger. The vehicle 100 is presented as being configured to be driven by a human driver, but the vehicle 100 may be a self-driving vehicle or a non-motorized vehicle such as a trailer. The vehicle 100 also includes a number of sensors and information gathering components, as discussed further below. Such components provide information to the insurance provider 108 for claims processing and appropriate responses.

These aspects of the vehicle 100 provide information to the insurance provider 108 when an accident or other insured event occurs, such as by notifying the insurance provider 108 that the accident has occurred and including information to generate a claim, as well as to assist the driver of the vehicle 100 when handling the accident. Such information may not be limited to the driver and may pertain to others including passengers and pedestrians For example, the driver may be concerned with insurance liability, but a passenger may separately need medical attention. Alternatively, the driver may be unconscious, and the insurance provider 108 may interact with a passenger instead. Also, as discussed above, a insurance policy covering the vehicle may be associated with an owner/policyholder of the vehicle rather than a driver or a passenger, and the driver or passenger may provide information from the vehicle 100 while having the insurance provider 108 process a claim based on the account of the owner/policyholder.

Figure 2:
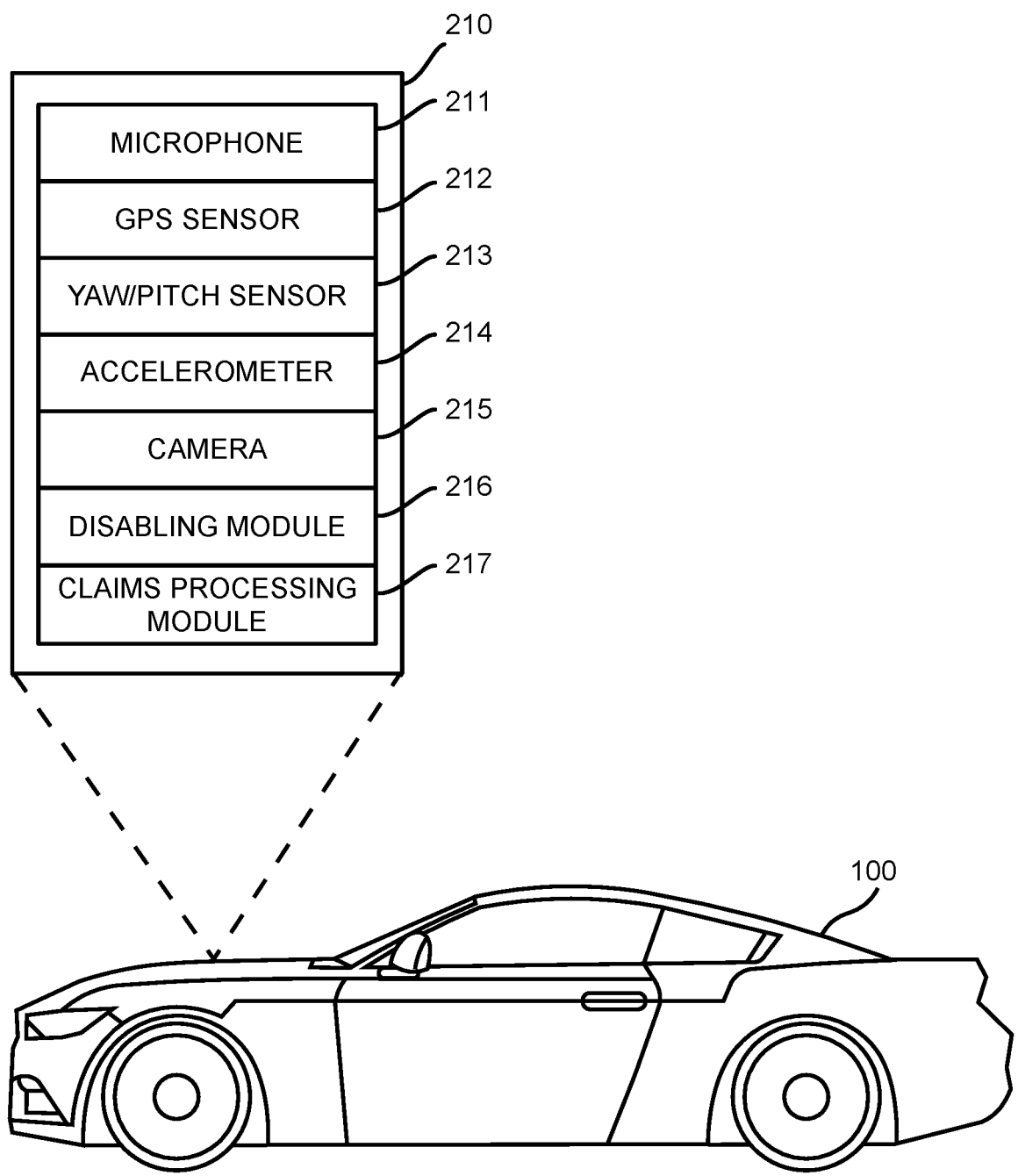
FIG. 2 is a schematic view of components associated with a vehicle, according to an embodiment.

FIG. 2 is a schematic view of components associated with a vehicle, according to an embodiment. Referring now to FIG. 2, a schematic diagram of an example embodiment of a plurality of components 210 of the vehicle 100, which may be connected to the insurance provider according to the techniques described herein may be provided. In this embodiment, the vehicle 100 is a motor vehicle with a driver, but it should be understood that other embodiments are possible, such as an autonomous vehicle that interacts with the insurance provider. In an example embodiment, the plurality of components 210 of the vehicle 100 may be used as part of a connected vehicle system and method as described herein. Such components may communicate information to the vehicle 100 and/or the insurance provider 108 (see FIG. 1).

In some embodiments, the plurality of components 210 of the vehicle 100 may include one or more sensors to detect or collect various data or other information associated with the vehicle 100. For example, in one embodiment, the plurality of components 210 includes a microphone 211. The microphone 211 may record and/or collect sounds associated with the vehicle 100, including sounds emanating from inside and/or outside of the vehicle 100. For example, a computer system of the vehicle 100 may store the sounds recorded and/or collected by the microphone 211, for example, recording sounds in the passenger compartment or interior of the vehicle 100 and/or sounds outside of the vehicle 100 that occur within a predetermined time period from a triggering event or accident. The predetermined time period may include the time of the triggering event or accident, a time window prior to the triggering event or accident, as well as a time window after the triggering event or accident. With this arrangement, relevant sounds related to the triggering event or accident may be obtained or recorded.

The microphone 211 may record loud noises corresponding to collisions, such as breaking glass or crunching rigid materials, which may be used by a computer system of the vehicle to determine that an accident has occurred. The microphone 211 may also record audio evidence of time periods before and after the accident. For example, the microphone 211 may record an exclamation by a driver or passenger of the vehicle 100 or of another vehicle in the accident that may help establish the circumstances of the collision and be used to apportion liability.

In an example embodiment, the plurality of components 210 may also include a global position system (GPS) sensor 212 or other location sensors. The GPS sensor 212 may obtain data associated with the location and/or movement of the vehicle 100. For example, the GPS sensor 212 may be configured to provide location, speed, heading, and other information associated with movement of the vehicle 100 within a predetermined time period from the triggering event or accident, as described above.

With this arrangement, relevant location and/or movement data associated with the vehicle 100 in connection with the triggering event or accident may be obtained or recorded. As discussed above, the location and/or movement data may include the time of the triggering event or accident, a time window prior to the triggering event or accident, as well as a time window after the triggering event or accident.

The data output by the GPS sensor 212 may be used to identify that an accident has occurred by identifying movement patterns that would correspond to an accident, such as a rapid deceleration or path deviation. The data output by the GPS sensor 212 may also provide valuable information about the cause and appropriate response to an accident.

In some embodiments, the plurality of components 210 may include one or more sensors configured to detect shocks or forces felt or applied to the vehicle 100, such as acceleration/deceleration information or impacts detected by a yaw/pitch sensor 213 and/or an accelerometer 214. For example, information recorded by the yaw/pitch sensor 213 and/or an accelerometer 214 may be used detect information associated with shocks, such as an impact, or lateral forces, such as during cornering or side impact, of vehicle 100 within a predetermined time period before, after, and during the triggering event or accident.

The accelerometer 214 may also detect information, such as G-forces, associated with acceleration/deceleration of the vehicle 100 before, after, and during the triggering event or accident. With this arrangement, relevant acceleration/deceleration and force information experienced by the vehicle 100 in connection with the triggering event or accident may be obtained or recorded. As discussed above, the yaw/pitch and/or accelerometer data may include the time of the triggering event or accident, a time window prior to the triggering event or accident, as well as a time window after the triggering event or accident.

Thus, a rapid deceleration, or another significant deviation from a usual path of the vehicle 100 as detected by the yaw/pitch sensor 213 or the accelerometer 214 may indicate an accident to the insurance provider 108. In some embodiments, the declaration may be compared to a threshold indicative of an accident. For example, the computer system of the vehicle 100 may compare a detected force to a threshold for an initial speed of the vehicle.

Similar to the microphone 211 and the GPS sensor 212, the outputs of the yaw/pitch sensor 213 and the accelerometer 214 may be tracked over a time window. Such data may capture the conditions leading up to an accident, what occurs at the time of the accident, and what the aftermath of the accident is. Additionally, in some embodiments, information from one or more of the yaw/pitch sensor 213 and/or the accelerometer 214 may be used to trigger the deployment of an airbag or other safety measures. For example, an impact or acceleration/deceleration above a predetermined threshold may be used to determine that a triggering event or accident has occurred to the vehicle 100 and to trigger a deployment of the airbag. Other safety measures may also be deployed, such as anti-lock braking as a non-limiting example. Information about the safety measure may be recorded by a control center of the vehicle and communicated to the insurance provider through a claims processing module 217.

In some embodiments, the plurality of components 210 may also include a camera 215 or several cameras. Similar to the microphone 211 and the GPS sensor 212, the outputs of the camera 215 may be tracked over a time window. The claims processing module 217 may be configured to provide instructions and commands to the insurance provider 108 in accordance with the example embodiments described herein. In an example embodiment, the claims processing module 217 may receive information indicative of an accident or other impact involving vehicle 100 from the camera 215, such as front-facing, rear-facing, or side-facing cameras, the yaw/pitch sensor 213 and/or the accelerometer 214.

As with the other plurality of components 210, the camera 215 may be used to record information from the time of the accident, as well as before and after. As discussed, the camera 215 may record video footage or still images. For example, the camera 215 may maintain several minutes of video footage, or may obtain still images at regular intervals, such as every five seconds, as a non-liming example.

In this embodiment, the plurality of components 210 provided in vehicle 100 is merely exemplary. However, it should be understood that plurality of components 210 may include a variety of different components. For example, sensors may track aspects of how the vehicle 100 is operated by the driver. In one example, the sensors may track how the user steers, activates the gas and/or brake pedals, changes gear, interacts with dashboard instruments, and so on. Additionally, conventional vehicle sensors include interfaces and communication mechanisms that permit the data and information obtained by these vehicle sensors to be transmitted to other components within the vehicle, as well as to the insurance provider 108. Together, the sensor information may facilitate crash detection, for example, in the case of an airbag deployment event, and reporting of sensor data to a control center of the vehicle 100 and/or an insurance provider 108, which may be approved by the vehicle manufacturer and vehicle owner.

Figure 3:
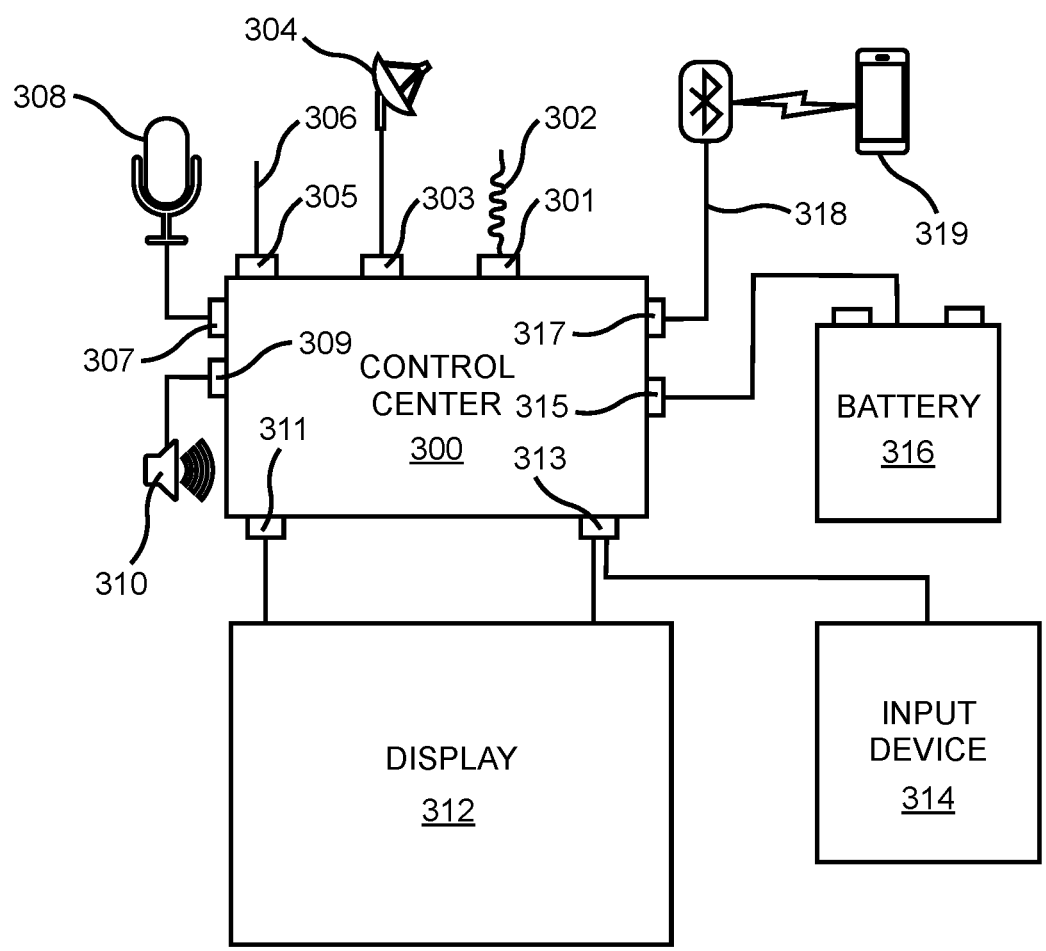
FIG. 3 is a schematic diagram of a control center and associated components, according to an embodiment.

FIG. 3 is a schematic diagram of several devices that are associated with the operation of the vehicle 100. A control center 300 can include a number of ports that facilitate the input and output of information and power within vehicle 100. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards. By using ports as described further below, the vehicle 100 manages its internal information and power flow.

All of the following ports and elements associated with the control center 300 are optional. Some embodiments may include a given port or associated element, while others may exclude it. The following description discloses many of the possible parts and elements that can be used, however, it should be kept in mind that not every part or element must be used in a given embodiment. FIG. 3 presents certain elements that are similar to those of FIGS. 1-2, and some that are different.

The control center 300 may include a wireless network antenna port 301 configured to receive information from a wireless network antenna 302, a GPS antenna port 303 configured to receive information from a GPS antenna 304, and a radio antenna port 305 configured to receive information from a radio antenna 306. These elements may implement the related elements of FIGS. 1-2.

The control center 300 can also include a number of items that facilitate human interaction. To receive voice commands from a user, the control center 300 can include a microphone port 307 that is capable of communicating with a microphone 318. The control center 300 can also include an audio port 309 that is configured to send audio information to one or more speakers 310 or audio devices. In some embodiments, the microphone port 307 and the audio port 309 are conductors associated with a single physical connector. For example, the microphone port 307 and the audio port 309 can be female conductors of a multi-channel coaxial plug, like a standard 2.5 millimeter (mm) or a standard 3.5 mm headset plug. It should be understood that this is a non-limiting example, and other plugs may be used in other examples. These elements may implement the related elements of FIGS. 1-2.

In order to provide visual information to a user, the control center 300 can include a display port 311 that is capable of interacting with a display device 312. To receive input from a user, the control center 300 can include an input port 313. The input port 313 can communicate with the input device 314. In some embodiments, the display device 312 can also receive input from a user. In some embodiments, the display device 312 includes a touch screen that can receive input via virtual buttons and controls and in other embodiments, the display device 312 includes a number of physical buttons and/or controls that can receive input. In some embodiments, the display device 312 includes both a touch screen and physical buttons. As shown in FIG. 3, user input received by the display device 312 can also communicate with the input port 313. It will also be recognized that the input port 313 may receive still images or video imagery using a camera, which may be integrated into the display device 312 or the input device 314, or may be provided separately. These elements may implement the related elements of FIGS. 1-2.

A power port 315 may connect the control center 300 to a power supply 316. In the embodiment shown in FIG. 3, the power supply 316 is a battery. The control center 300 can also include elements to communicate with a smart phone 319. Any system can be used to facilitate this communication with the smart phone 319; however, a low power radio frequency system is preferred. In an exemplary embodiment, a wireless local or personal area network using the BLUETOOTH or WI-FI protocol is used to facilitate communication with the smart phone 319. In the exemplary embodiment shown in FIG. 3, the control center 300 includes a local wireless network antenna port 317 that is configured to communicate with a local wireless network antenna 308, which in turn, is configured to communicate wirelessly with the smart phone 319. The smart phone 319 may be helpful in examples, in that it may help provide a wireless connection between control center 300 and the insurance provider 108, and it may allow a user to input (phone, SMS message, e-mail, etc.) additional information used for processing the insurance claim, if needed.

Referring to FIGS. 1 and 3, there are at least two ways in which the control center 300 can communicate with the wireless network 106. In some embodiments, the control center 300 includes elements that permit the control center 300 to act as a communications device, for example, a wireless communications device. In these embodiments, the control center 300 may communicate directly with the wireless network 106 using the wireless network antenna port 301 and the wireless network antenna 302.

In other embodiments, the control center 300 communicates with the smart phone 319, which in turn, communicates with wireless network 106. In these other embodiments, the control center 300 can use local wireless network antenna port 317 and associated local wireless network antenna 308 to assist in facilitating communications with the smart phone 319. One or both of these methods can be used by the control center 300 to communicate with the wireless network 106.

The control center 300 can also include memory and/or data storage elements including one or more databases and/or one or more processors. These elements may help aggregate, organize, and enrich data from the vehicle 100 to share with the insurance provider 108.

In some embodiments, the elements illustrated in FIG. 3 are housed in a single case or unit. In other embodiments, one or more of the elements illustrated in FIG. 3 are distributed throughout the vehicle 100 (see FIG. 1) and communicate with one another via known wired or wireless methods, such as through a wiring harness of the vehicle 100. In one example, in a system where one or more of the elements communicate wirelessly, the BLUETOOTH or WI-FI protocol can be used.

Figure 4:
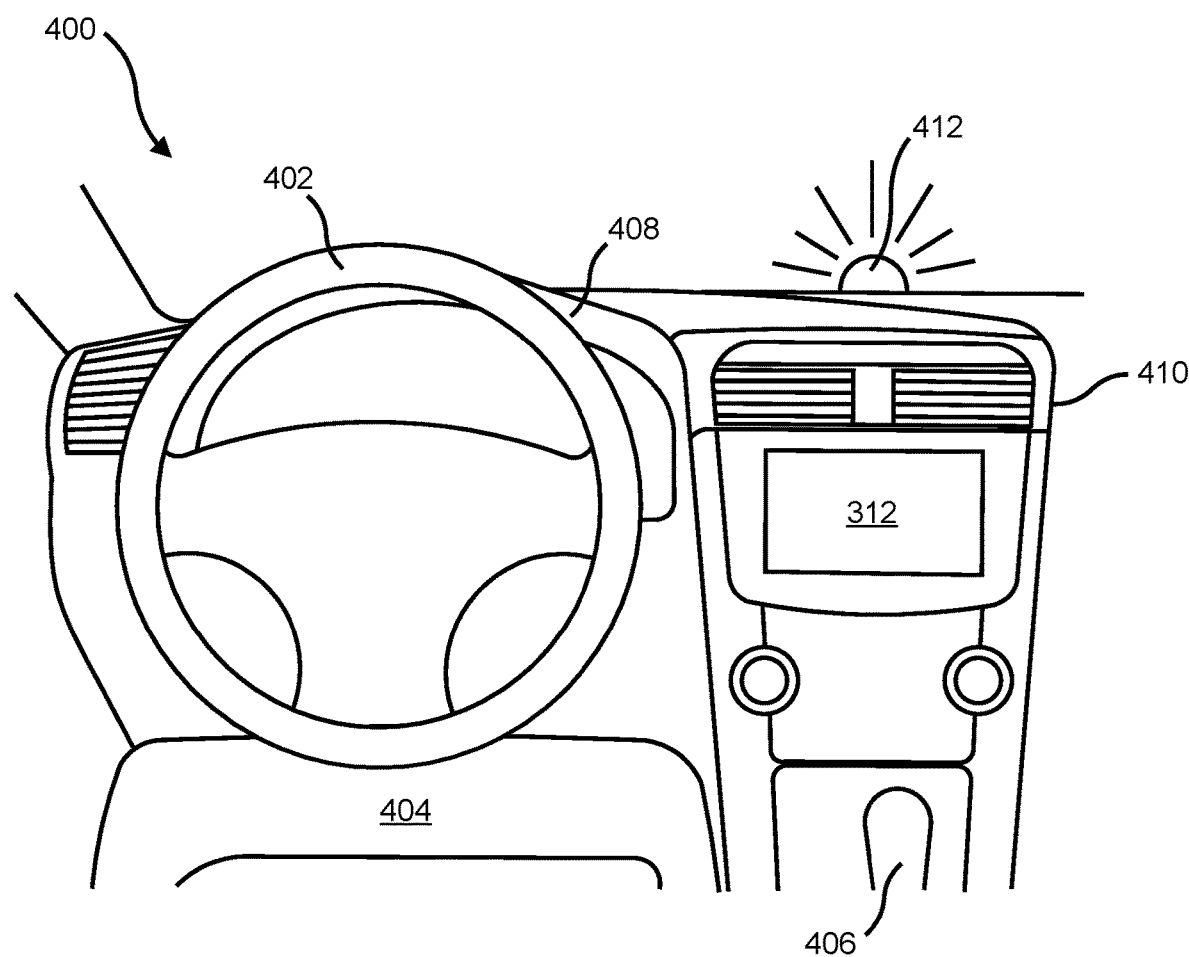
FIG. 4 is a schematic view of a dashboard of a connected vehicle, according to an embodiment.

FIG. 4 is an example embodiment of an interior 400 of the passenger cabin 126 of the vehicle 100 of FIG. 1. The interior 400 includes a steering wheel 402, a driver's seat 404, a shifter or gear selector 406, a dashboard 408 and a center console 410. The center console 410 may include a display device 312. In some embodiments, the center console 410 includes a multi-function unit that can communicate or control an audio system, a climate control system and/or a navigation system. In some embodiments, the center console 410 may include an indicator 412, such as a light, a strobe, or display showing a maximum load or G force experienced by the vehicle 100. The indicator 412 may be used to indicate a status or condition of the vehicle 100, such as in a case that the vehicle has been immobilized by the control center 300 following an accident. In one example, the indicator 412 may be controlled by the control center 300, which lights the indicator 412 when a claims processing module determines that the vehicle 100 is a loss, for example, in a case where the accelerometer 214 records a declaration in excess of a threshold, such as 30 G.

In an exemplary embodiment, the display device 312 is used as the display device 312, shown schematically in FIG. 3. Also, in the exemplary embodiment, the control center 300 or portions of the control center 300 is disposed behind the display device 312. In some embodiments, the display device 312 can include a touch screen and in some embodiments, buttons can be disposed next to the display device 312.

Thus, FIG. 4 provides for the user, such as a driver or a passenger, to have the ability to interact with the vehicle through the display device 312 and any other related controls, such as buttons, dials, sliders, and so on, as non-limiting examples. The user may also pair a device such as a smartphone with the vehicle 100 and accordingly interact with the vehicle 100 when filing a claim. While filing a claim is fully automated in some embodiments, some embodiments may require some interaction with a user.

According to some embodiments, a vehicle 100 may include a sensor, such as the yaw/pitch sensor 213 or accelerometer 214, configured to collect sensor information about the vehicle 100, a control center 300 connected to the sensor and configured receive the sensor information from the sensor, to classify the sensor information, and an indicator, such as indicator 412 or display device 312, configured to visually indicate a classification of the sensor information. The control center 300 may be configured to classify the vehicle 100 as a loss upon determining that the sensor information exceeds a threshold. In one example, the control center 300 may communicate with a disabling module 216 to disable the vehicle, for example, engine disabler, starter disabler, or another immobilizer. In one example, the indicator is an infotainment system in the vehicle. In another example, the indicator may be a light on a dashboard of the vehicle.

Figure 5:
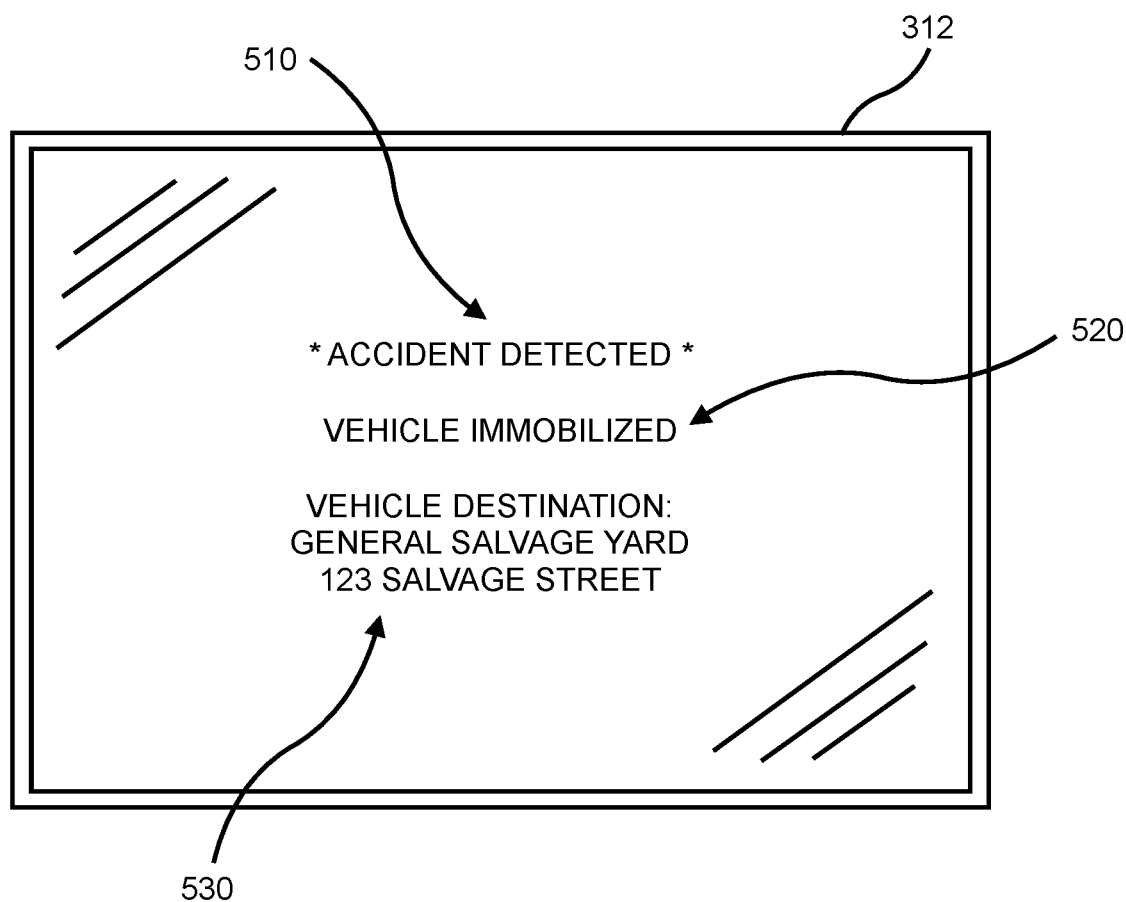
FIG. 5 is a schematic view of an infotainment display of a connected vehicle, according to an embodiment.

FIG. 5 is a schematic view of an infotainment display of a connected vehicle, according to an embodiment. The control center 300 may display various information using the display device 312. For example, the control center 300 may display messages about detected events 510, about vehicle status 520, and/or about recommended actions 530. The detected events 510 may be detected accidents, road conditions, weather conditions, and sensor information generally. The vehicle status 520 may include analogous information indicated by the indicator 412, for example, information about whether the vehicle has been immobilized in a case where some sensor information exceeds a threshold, such as a force of an impact, or sensor information records a specific parameter, such as the yaw/pitch sensor 213 recording a roll-over event. Additional information may be displayed by display device 312 and the control center 300, such as a recommended action 530, which may be an address for a salvage yard, a body repair shop, or an inspection station, for example. According to some embodiments, the control center 300 uses the sensor information to make a decision about a status of the vehicle 100 and about the recommended action 530. For example, in a case where the sensor information exceeds a threshold or sensor information records a specific parameter, the control center 300 may determine that the vehicle 100 is a loss and is to be, as an initial step, transported to a salvage yard. Such a decision, made by the control center 300 using the sensor information, may increase the speed and accuracy of decisions made by the insurance provider 108. For example, a correct determination of the loss of a vehicle can avoid excess costs associated with transport of the vehicle 100 to an inspection station and subsequently to a salvage yard.

Figure 6:
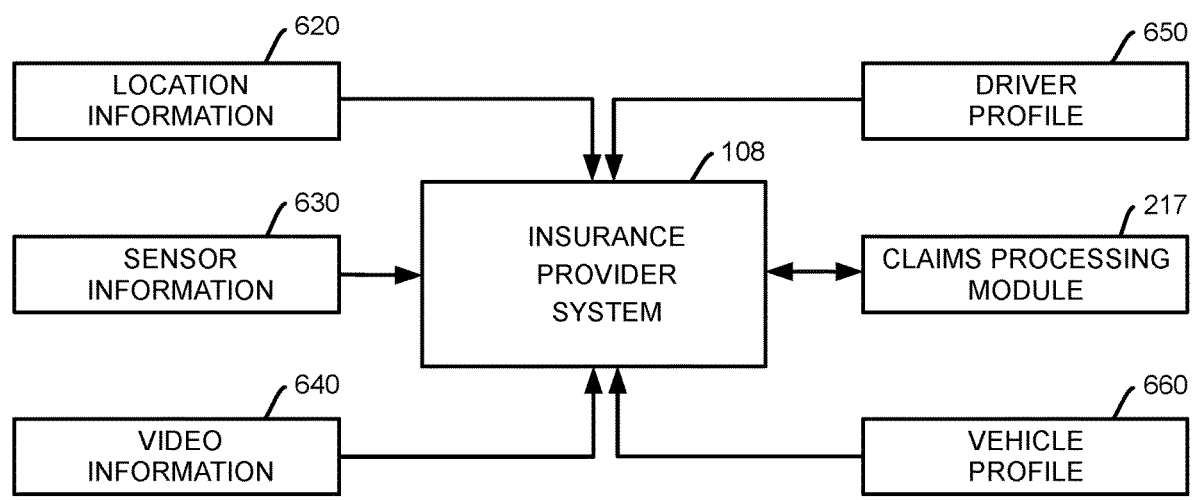
FIG. 6 is a schematic view of an insurance provider that receives information from a variety of information sources, according to an embodiment.

FIG. 6 is a schematic view of an insurance provider 108 that receives information from a variety of information sources, according to an embodiment. For example, the insurance provider 108 may be a computer system that receives information from a variety of information sources. Some of these information sources are integrated into the vehicle, and some of the information sources are external to the vehicle. For example, the insurance provider 108 may receive location information 620, sensor information 630, and video information 640 from the vehicle, as non-limiting examples of information sources integrated into the vehicle. Greater details about these types of information are discussed above, with respect to FIGS. 2-4, and below, with respect to FIGS. 7-8. Additional information built into the vehicle may be used in other examples.

The insurance provider 108 may receive driver profile information 650 and vehicle profile 660, as non-limiting examples of information sources external to the vehicle. Greater details about these types of information are discussed below, with respect to FIGS. 7-8.

Other external information may be used in other embodiments. For example, the insurance provider 108 may access information about other passengers in the vehicle 100 besides the driver, or policy information. If available, the insurance provider 108 may find it helpful to access information from a geographic information system (GIS).

FIG. 6 also shows the claims processing module 217, which communicates with the insurance provider 108. Claims processing module 217 aggregates, processes, and manages information provided by other elements of FIG. 6 that are provided to the insurance provider 108. For example, the claims processing module 217 may integrate the location information 620, the sensor information 630, the video information 640, the driver profile information 650, and the vehicle profile 660. The claims processing module 217 may be an integrated element of the vehicle itself and may manage the claims process on behalf of the vehicle. Alternatively, the claims processing module 217 may be part of a device of a user of the vehicle, such as a mobile device, where the device uses the claims processing module 217 to manage the claims process by performing some of the claims processing at the device and gathering information as needed from the vehicle.

According to some embodiments, a vehicle 100 connected to an insurance provider 108 includes a sensor configured to collect sensor information about the vehicle 100, a control center 300 configured to receive the sensor information collected by the sensor, to detect, using the sensor information, an event, and a claims processing module 217 configured to receive the sensor information and to generate a claim with the insurance provider 108 using the sensor information upon detection of the event, wherein the claims processing module is configured to determine an apportionment of liability determined using the sensor information and to include the apportionment in the claim. As described herein, the sensor may be, for example, a camera, an accelerometer, or other device configured to collect sensor information. In one example, given the sensor information, the claims processing module may determine an apportionment in favor of a driver of the vehicle upon determining that the event is an impact on the rear-end of the vehicle and the vehicle is one of static or in a state of forward motion. In another example, the claims processing module may determine an apportionment in favor of a third-party upon determining that the event includes passing through an intersection when a red light is shown in the direction of travel of the vehicle. Other examples are contemplated.

According to some embodiments, the claims processing module may use the sensor information to generate an automatic estimate of a severity of the event, the location of the event, and a cost to fix of damage associated with the claim. In one or more example, the claims processing module is triggered by the sensor information, which may generate the claim. In some examples the claim may be pushed to the user prior to automatic processing. According to some aspects, the control center may recommend actions, for example, to obtain additional information needed for the claim, or provide shortcut selections to the user, for example, to call emergency services. In one example, the control center may prompt the user to collect insurance information from another driver involved in an accident.

Figure 7:
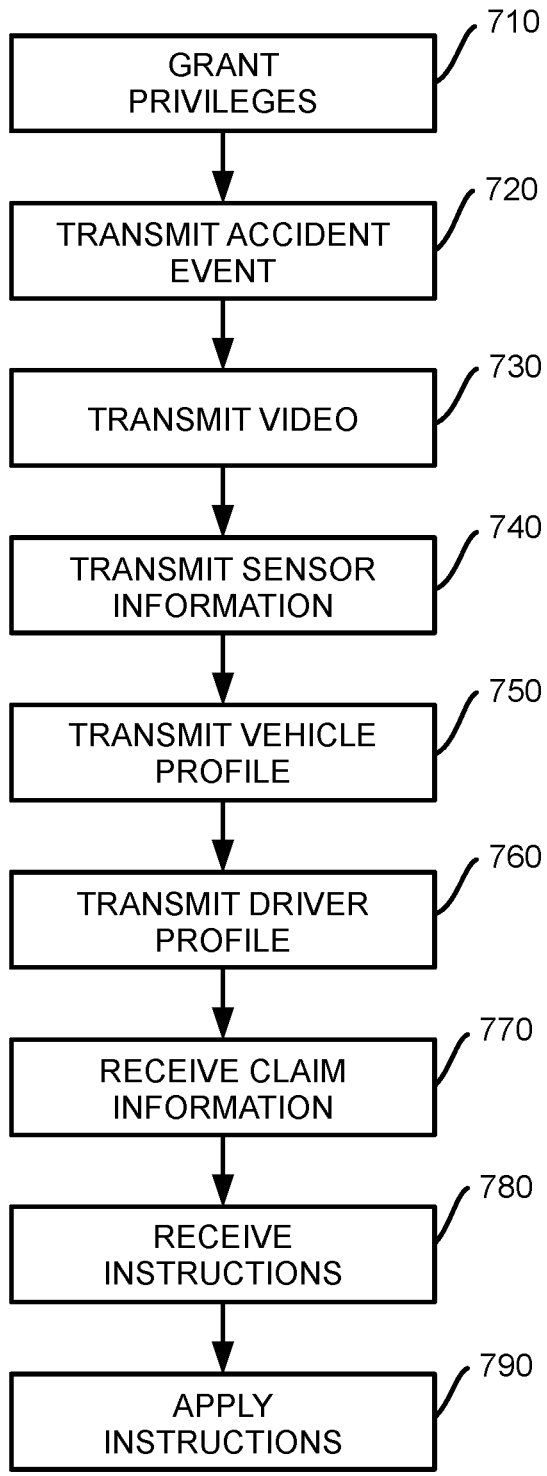
FIG. 7 is a flow chart of automatic claims generation by a vehicle, according to an embodiment.

FIG. 7 is a flow chart of automatic claims generation by a vehicle, according to an embodiment. The claims processing module 217 of the vehicle 100 may grant privileges to the insurance provider 108 to receive sensor information and indications of detected events that might indicate the occurrence of an insured event (operation 710). More details about what sensor information and which detected events might indicate such an occurrence are provided in operation 720. However, in general operation 710 creates a relationship between the vehicle 100 and the insurance provider 108 such that the vehicle 100 is configured such that, upon the occurrence of an accident, the vehicle 100 will send appropriate information to the insurance provider 108, and the insurance provider 108 will access other appropriate information, as discussed below. For example, the vehicle 100 may send credentials such as an identifier associated with the driver, an identifier associated with the user, or an identifier associated with a policyholder creates a relationship between the vehicle 100 and the insurance provider 108.

The vehicle 100 may transmit an indication of a detected event such as accident, a roll-over, or a roadway departure, to the insurance provider 108 (operation 720). For example, an accident event might include a variety of occurrences detected by the vehicle 100. As particular examples of sensor information can include an airbag deployment, a loud noise detected by the microphone 211, a rapid deceleration detected by the GPS sensor 212, the yaw/pitch sensor 213, and/or the accelerometer 214, or an image or video footage obtained from the camera 215 that indicates that an accident has occurred. Once the vehicle 100 determines that an accident has occurred and has notified the insurance provider 108 of such, the vehicle 100 may proceed to send various types of information to the insurance provider 108, as discussed further, below.

The vehicle 100 may transmit a video of an accident to the insurance provider 108 (operation 730). For example, the camera 215 may capture footage of the area surrounding the vehicle 100. The camera 215 may include at least one camera, and each camera may be a digital camera. The camera 215 may include at least one of a front-facing camera, a rear-facing camera, and a side-facing camera, as non-limiting examples. For example, the camera 215 may be dash mounted, hood mounted, installed in mirrors, or installed on a rear of the vehicle 100, as non-limiting examples. As a non-limiting example, the camera 215 captures visible light, infrared light and/or ultraviolet light. For example, the camera 215 may acquire video footage and/or still images. While operation 730 is characterized as video, at least one still image may be exchanged instead. In another example, the vehicle may use biometrics to identify a user driving the car during the accident.

The vehicle 100 may transmit sensor readings to the insurance provider 108 (operation 740). A variety of sensors may be relevant in operation 740. For example, FIG. 2 shows the microphone 211, the GPS sensor 212, the yaw/pitch sensor 213, and the accelerometer 214. However, these are non-limiting examples, and other sensors may gather information about the area of the vehicle, the interior of the vehicle, and a status of any users of the vehicle.

The vehicle 100 may transmit a vehicle profile to the insurance provider 108 (operation 750). For example, the vehicle profile may include information such as a make, model, model year, trim, and so on of the vehicle 100. The vehicle profile may also include information related to a repair history of the vehicle 100, as well as any information from internal sensors within the vehicle 100 (such as problematic brakes, service required, low oil, gasoline level, etc.). The vehicle profile may also include version numbers for major pieces of software or firmware that is part of the vehicle's control system or subsystems. This information may be stored at the vehicle 100 and transmitted to the insurance provider 108 or stored at insurance provider 108 and retrieved using an identifier (such as a vehicle identification number, commonly called a "VIN").

The vehicle 100 may transmit a driver profile to the insurance provider 108 (operation 760). For example, driver profile may include identifying information, such as name, address, phone number, other contact information, identifying numbers such as social security number and/or driver's license number, demographic information (age, race, etc.). In some examples, the driver profile may include a personality setting, for example, an aggressiveness setting and/or preference. The driver profile may also include information measured by sensors at the vehicle 100 (such as whether the driver has been injured, blood pressure, pulse, blood oxygen, etc.). This information may be stored at the vehicle 100 and transmitted to the insurance provider 108 or stored at the insurance provider 108 and retrieved using an identifier (such as a social security number or driver's license number). In some embodiments, similar information may be provided for a passenger as well.

The vehicle 100 may receive claim information from the insurance provider 108 (operation 770). Such information is generated by the insurance provider 108 in operation 870 and transmitted in operation 880. FIG. 7 illustrates a use case in which the insurance provider 108 generates the claim information fully automatically, but other scenarios are possible in which the vehicle 100 allows some interaction with the insurance provider 108 to provide some limited information when generating the claim. For example, the vehicle 100 may receive claim information from the insurance provider 108 in operation 770 based on an interaction between the claims processing module 217 and insurance provider 108. As discussed above, the claims processing module 217 may be integrated into the vehicle 100 and may directly manage interactions between the vehicle 100 and the insurance provider 108.

In an alternative embodiment, the claims processing module 217 may be integrated into a device of a user of the vehicle 100. For example, such a device may be, but is not limited to, a smartphone, or another mobile computing device with which the user interacts. In such an embodiment, the device gathers information from the vehicle 100 using claims processing module 217, and then the claims processing module 217 interacts with the insurance provider 108 to process the claim automatically and receive claim information at operation 770. The user may also interact with the device in some embodiments when processing the claim.

The vehicle 100 or a user of the vehicle 100 may receive accident instructions (operation 780). For example, the accident instructions may include instructions about how to react to the accident, such as by exchanging insurance and/or identifying information, calling a tow truck, calling police, calling firefighters, or calling an ambulance. Other instructions may be to get vehicles off of the road, and so on.

The vehicle 100 or a user of the vehicle 100 may apply accident instructions (operation 790). Operation 780 includes accident instructions, so in operation 790, the user or vehicle may follow instructions. For example, a user may exchange insurance information, or the vehicle may automatically initiate an emergency call to summon an ambulance.

Figure 8:
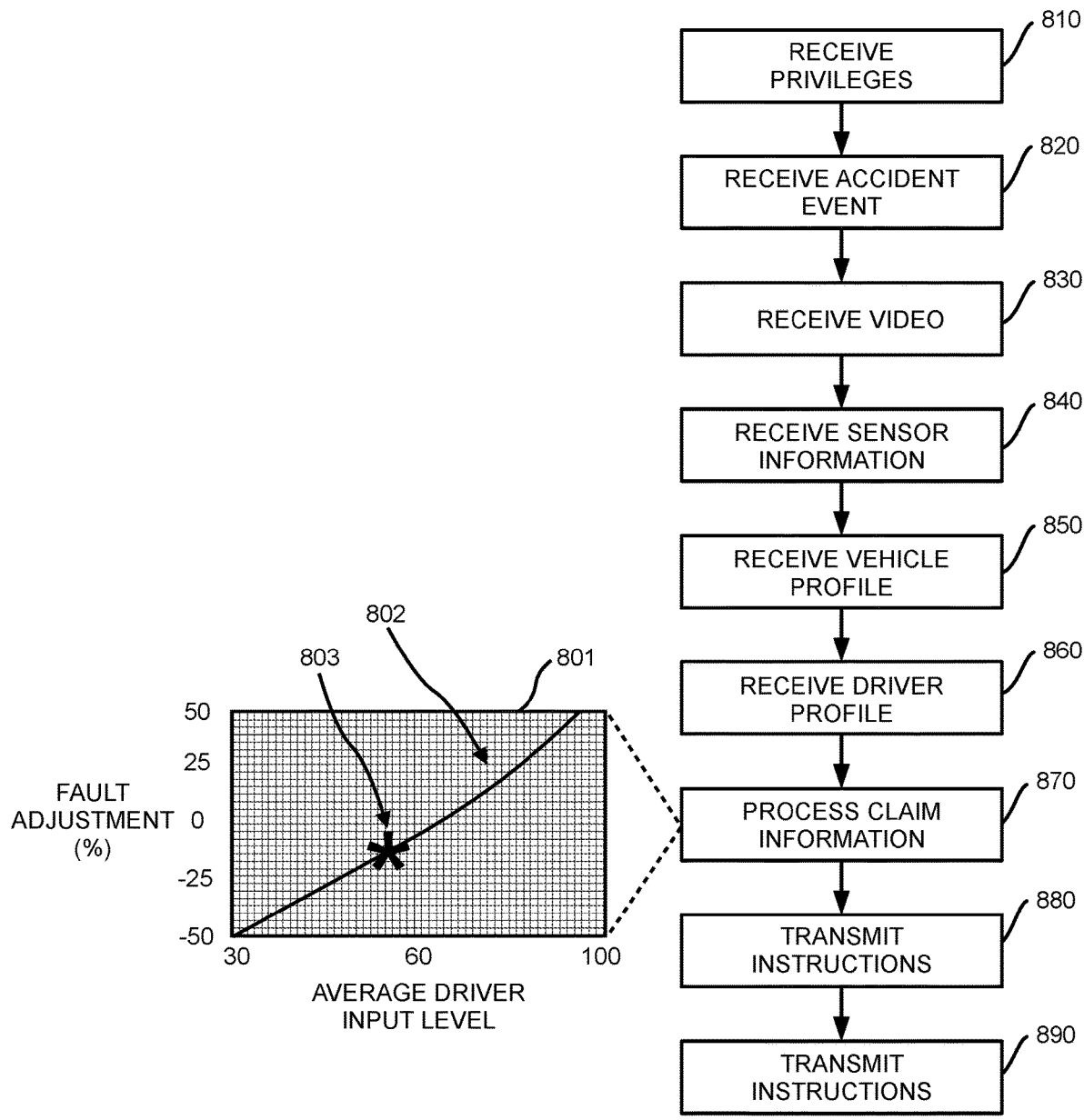
FIG. 8 is a flow chart of automatic claims processing by an insurance provider, according to an embodiment.

FIG. 8 is a flow chart of automatic claims processing by an insurance provider, according to an embodiment. The insurance provider 108 may receive privileges from the vehicle 100 to receive information about events that might indicate the occurrence of an event (operation 810). Operation 810 corresponds to operation 710, and the insurance provider 108 receives information from vehicle 100 that corresponds to what the vehicle 100 grants and transmits in operation 710. As discussed, these privileges allow the insurance provider 108 to subsequently receive a variety of different types of information, which may inform the insurance provider 108 of the need to process the claim and may provide the requisite information to process such a claim.

The insurance provider 108 may receive information about an accident event from the vehicle 100 (operation 820). Operation 820 corresponds to operation 720, and the information about an accident event provided by the vehicle 100 is that discussed in operation 720.

The insurance provider 108 may receive from the vehicle 100 a video of an accident from the vehicle 100 (operation 830). Operation 830 corresponds to operation 730, and the video information related to an accident provided by the vehicle 100 is that discussed in operation 730.

The insurance provider 108 may receive sensor readings to from the vehicle 100 (operation 840). Operation 840 corresponds to operation 740, and the information about sensor readings provided by the vehicle 100 is that discussed in operation 740.

The insurance provider 108 may receive a vehicle profile from the vehicle 100 (operation 850). Operation 850 corresponds to operation 750, and the information about an accident event provided by the vehicle 100 is that discussed in operation 750. As noted in operation 750, the vehicle profile may be received in one of two ways. First, vehicle 100 may provide the vehicle information to the insurance provider 108 itself (including identifiers of the vehicle 100, as well as properties of the vehicle, such as make, model, age, condition prior to the accident, etc.) or may provide an identifier to the insurance provider 108, such that the insurance provider 108 uses the identifier to access information corresponding to vehicle 100 stored by the insurance provider 108, in an appropriate data repository.

The insurance provider 108 may receive a driver profile (operation 860). Operation 860 corresponds to operation 760, and the information about a driver provided by the vehicle 100 is that discussed in operation 760. Driver profile may include information stored prior to the accident. For example, driver profile may include identifying information, such as name, address, phone number, other contact information, identifying numbers such as social security number and/or driver's license number, demographic information (age, race, etc.). The driver profile may include information gathered over time, such as a personality type determined for a certain time window prior to the accident. The personality type may be a classification of the driver's inputs made in real time, which may, for example, detect a level of aggressiveness based on throttle and brake applications and loads experienced due to steering inputs. In one example, the level of aggressiveness may be determined to be "high" in a case where throttle and brakes applications are, on average, over 50 percent in a time window of 5 minutes prior to the accident. Other personality types are contemplated, including for example, attentiveness, which may be measured based on eye movements or a number of times that a lane-keep assist feature of the vehicle is activated. Such driver profile information may be stored by the vehicle 100 and transmitted to the insurance provider 108 or stored by insurance provider 108 and accessed using an identifier or credential provided by the vehicle 100. The driver profile may also include information measured by sensors at the vehicle 100 (such as whether the driver has been injured, blood pressure, pulse, blood oxygen, etc.).

While operation 860 is primarily directed to managing information for a driver, it may be recognized that operation 860 may also involve gathering information for a passenger of the vehicle 100. As per the driver profile, passenger profile information may include general, preexisting information as well as information related to the passenger's status based on the accident (such as whether the passenger has been injured, blood pressure, pulse, blood oxygen, etc.).

Once the insurance provider 108 has the various information received earlier in FIG. 8, such as the notification of the accident event (operation 820), video footage (operation 830), sensors readings (operation 840), vehicle profile information (operation 850), driver profile information (and optionally passenger profile information) (operation 860), insurance provider processes a claim (operation 870). As discussed, the insurance provider may process a claim by interacting with the claims processing module 217, which may be part of the vehicle 100 itself or a device of a user paired with the vehicle 100.

When processing a claim, as in operation 870, the insurance provider 108 determines the parameters of what has occurred in the accident, and establishes how to allocate liability and take care of damage to the vehicles and ensure proper medical care for the drivers of cars involved in the accident, as well as any passengers. Thus, in operation 870, the insurance provider 108 determines the role the insurance provider 108 should take in order to provide its legal obligation to the parties in the accident, as well as provide other helpful actions to control the damage of the accident. In one or more examples, in operation 870, the insurance provider 108 may use the personality type included in the driver profile to assess fault of the driver involved in the accident. For example, the insurance provider 108 may compare a personality curve 802 provided by a vehicle manufacturer to a measure of the driver personality type 803 included in the driver profile in evaluating driver fault. In at least one case, the degree of fault may be adjusted by the insurance provider 108 according to the level of aggressiveness determined based on the driver's inputs to the vehicle. As illustrated in graph 801 of FIG. 8, the driver profile received from the vehicle indicates an average driver input level of about 55 percent, which corresponds to an adjustment of a degree of fault of about-20 percent. In an example case, there may be no adjustment of the degree of fault at an average driver input level of about 65 percent and a 50 percent increase in the degree of driver fault for an average driver input level above about 90 percent. Other curves or thresholds levels may be used in evaluating driver fault.

Once the insurance provider 108 has processed the claim information, it transmits the claim information to the vehicle 100 (operation 880). Such claim information may instruct the vehicle 100, as well as a user what the insurance provider 108 believes its responsibility to be (payment, providing rental car, providing repair, etc.).

Finally, the insurance provider 108 may transmit accident instructions (operation 890). The instructions may include suggestions for the user (e.g., exchange information) or instructions to emergency responders or third parties (summon an ambulance or tow truck).

Figure 9:
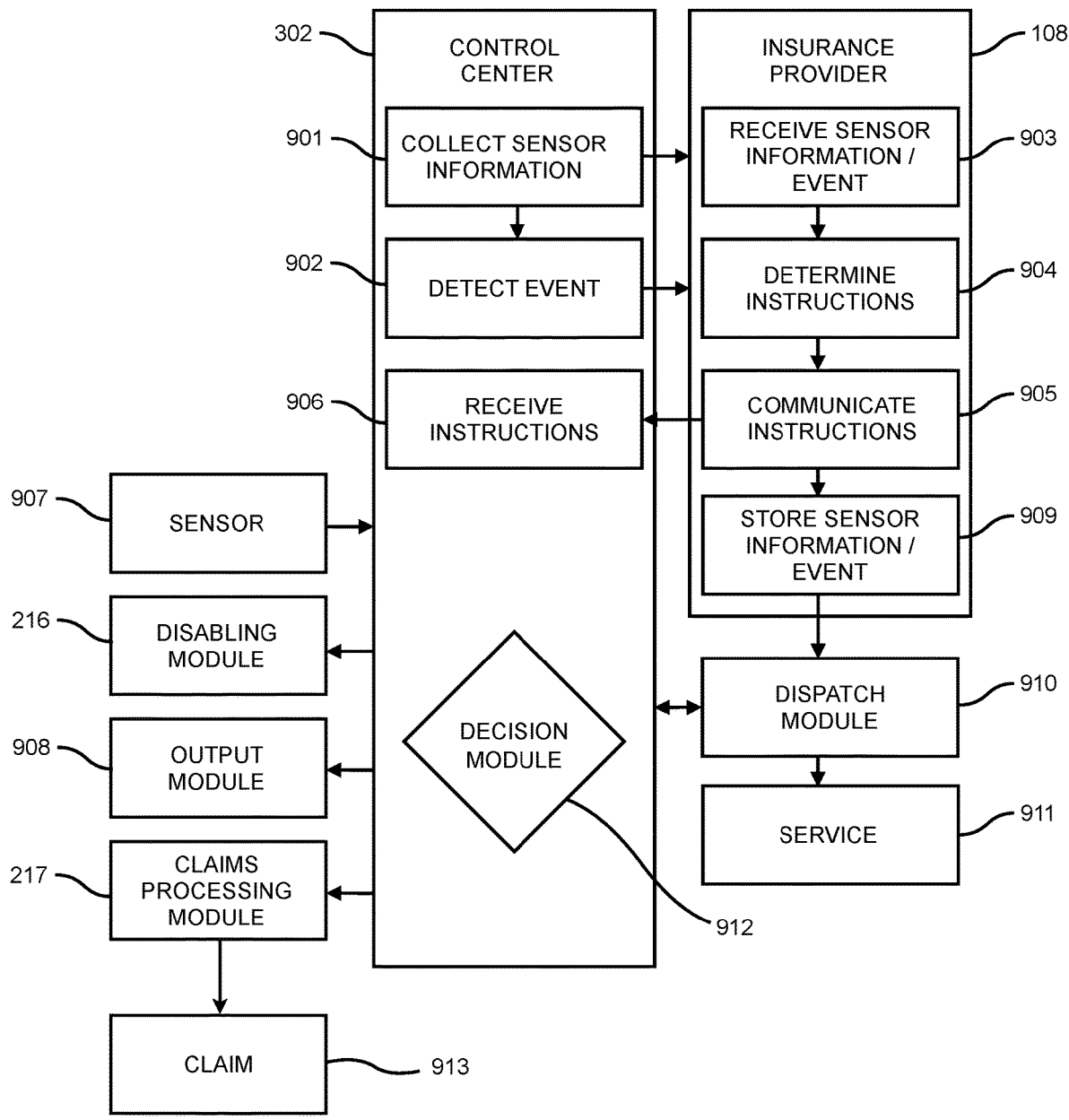
FIG. 9 is a flow chart of an event response, according to an embodiment.

FIG. 9 is a flow chart of an event response, according to an embodiment. In yet another example, the vehicle 100 includes the control center 300 connected to the insurance provider 108. The vehicle 100 may include a sensor 907 (see also 211-215 of FIG. 2) configured to collect sensor information about the vehicle. The control center 300 connected to the sensor (see for example FIG. 2) may be configured receive the sensor information from the sensor (operation 901), to detect an event using the sensor information (operation 902), wherein the event includes a classification, and to transmit the sensor information and an indication of the event to the insurance provider, and to a claims processing module 217 connected to the control center 300.

The claims processing module 217 may be configured to generate, upon detection of the event, a claim with the insurance provider 108 using the sensor information, and an output module 908 configured to indicate a classification of the sensor information. The output module 908 may be, for example, display device 312 or indicator 412, configured to indicate or display a status of the vehicle 100 and/or indication or display the instructions received from the insurance provider 108.

In some examples, the detection of the event (operation 902) includes a comparison of the sensor information to damage parameters in order to make decisions, using the decision module 912, about the status of the vehicle 100, to make decisions about the activation of the disabling module 216, to output status indicators via the output module 908, and/or make decisions, by the claims processing module 217, about an apportionment of liability. For example, where the sensor 907 detects a lateral force in excess of 25 G's, the control center 300, using the decision module 912, may activate the disabling module 216 to prevent further operation of the vehicle 100 and control the output module 908 to indicate that the vehicle has been immobilized and is to be transported to a salvage yard.

In some examples, the claims processing module 217 uses the sensor information (operation 901) and the detected event (operation 902) to generate a claim 913. For example, in a case where a force on the vehicle 100 is detected by the sensors 907 as a read-end collision in a case where the vehicle is at a stop, the claims processing module 217 may apportion liability away from a driver of the vehicle 100 and generate a no-fault claim, which may be communicated to the insurance provider 108.

In some cases, the control center 300 may receive instructions from the insurance provider 108 (operation 906), for example, based on a detected location of the vehicle 100, for example, detected by the sensor 907, to display instructions using the display device 312 for the transport the vehicle 100 to a nearest repair facility as determined in operation 904.

The insurance provider 108 may receive the sensor information and an indication of the detected event (operation 903) and determine instructions (operation 904), which may be communicated to the control center (operation 905). In some embodiments, the insurance provider 108 may include a memory or database for storing sensor information and the indication of the detected event (operation 909).

The insurance provider 108 and/or the control center 300 may include a dispatch module 910 configured to automatically contact one or more services in response to the determined instructions at operation 904 in relation to the handling of the vehicle 100, which may be determined automatically given the sensor information and detected event. For example, the dispatch module 910 may automatically contact service assets 911 to automatically supply medical and/or repair services to a detected location of the vehicle 100, and/or to recover the vehicle 100 given the sensor information (collected at operation 901) and detection of the event (operation 902).

Figure 10:
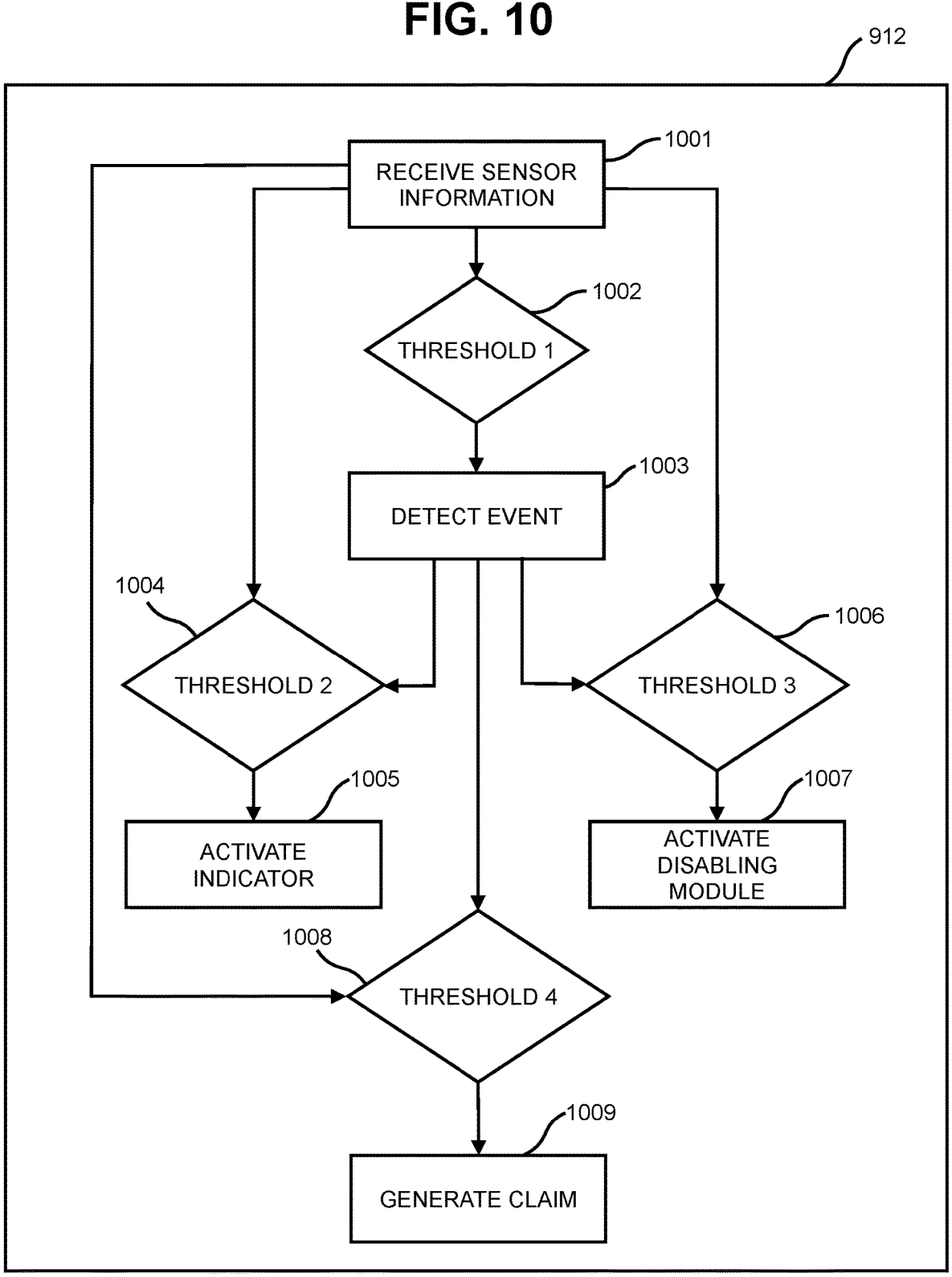
FIG. 10 is a flow chart of a method of a decision module, according to an embodiment.

FIG. 10 is a flow chart of a method of the decision module 912, according to an embodiment. In some examples, the sensor information is received (operation 1001) and the sensor information is compared to parameters (operation 1002), such as thresholds and acceptable operating ranges, such that an event can be detected (operation 1003). These events may include, for example, collisions, impacts, rollovers, the detection of water, and the detection of fire. The decision module 912 may use one or both of the sensor information and the detected events to make decisions about activating indicators (operation 1004 and operation 1005), activating the disabling module (operation 1006 and operation 1007), and generating claims (operation 1008 and operation 1009), for example. In one example, the decision module 912 may use one or both of the sensor information and the detected event to make a decision (operation 1004) about whether to activate an indicator (operation 1005). In another example, the decision module 912 may select, at operation 1004, an appropriate indicator (operation 1005). More particularly, the decision module 912 may make a determination, at operation 1004, to display an indicator of a certain classification of damage (e.g., either above or below a threshold (threshold 2)) based on a number and type of airbags deployed as indicated by the sensor information. Example classifications of damage include, water damage event detected, front-end damage (e.g., low, moderate, or high depending on recorded video and/or forces), rear-end damage (e.g., low, moderate, or high depending on recorded images and/or forces), airbag(s) deployment event detected, fire event detected, for example, by the camera, roll-over event detected, for example, by the yaw/pitch sensor, and ranges of damage valuation, including total loss, determined using sensor information, such as the force of an impact, the direction of an impact, or whether one or more tires lost air pressure. By way of non-limiting examples, a front-end impact may be classified as a low level if the force of impact is less than 5 Gs, as a moderate level if the force of impact is between about 5-15 Gs, and high level above 15 Gs, or if the force of impact is between 5-15 Gs in combination with the camera capturing an impact with a tree or security bollard. In another example, at operation 1006 the decision module 912 may determine, using the sensor 907, that a water level outside of the vehicle 100 reached above a certain threshold height (threshold 3), for example, reaching a water sensor located above a lower seal of an engine, where the decision module 912, may activate the disabling module 216 to prevent further operation of the vehicle 100. In yet another example, the decision module 912 may use one or both of the sensor information and the detected event to make a decision (operation 1008) about whether to generate a claim (operation 1009), sending the claim to the insurance provider 108, for example, in a case of an impact occurring when the vehicle 100 was traveling above a certain speed, such as 10 miles per hour. In this example, below the threshold speed (threshold 4), the claim may not be automatically generated, and the decision may be left to a policy holder.

According to FIG. 10, each decision may use one or more of the sensor information and the detected event. In some cases, certain detected events may, on their own, meet a threshold, for example, in the case of a roll-over event, each of the indicator, disabling module, claim generation may be triggered. In other examples, the sensor information may be sufficient, on its own to meet one or more of the thresholds.

In FIG. 10, threshold 2, threshold 3, and/or threshold 4 may be a same threshold, which may cause the control center to activate an indicator (operation 1005), activate the disabling module (operation 1007), and/or generate a claim (operation 1009).

Figure 11:
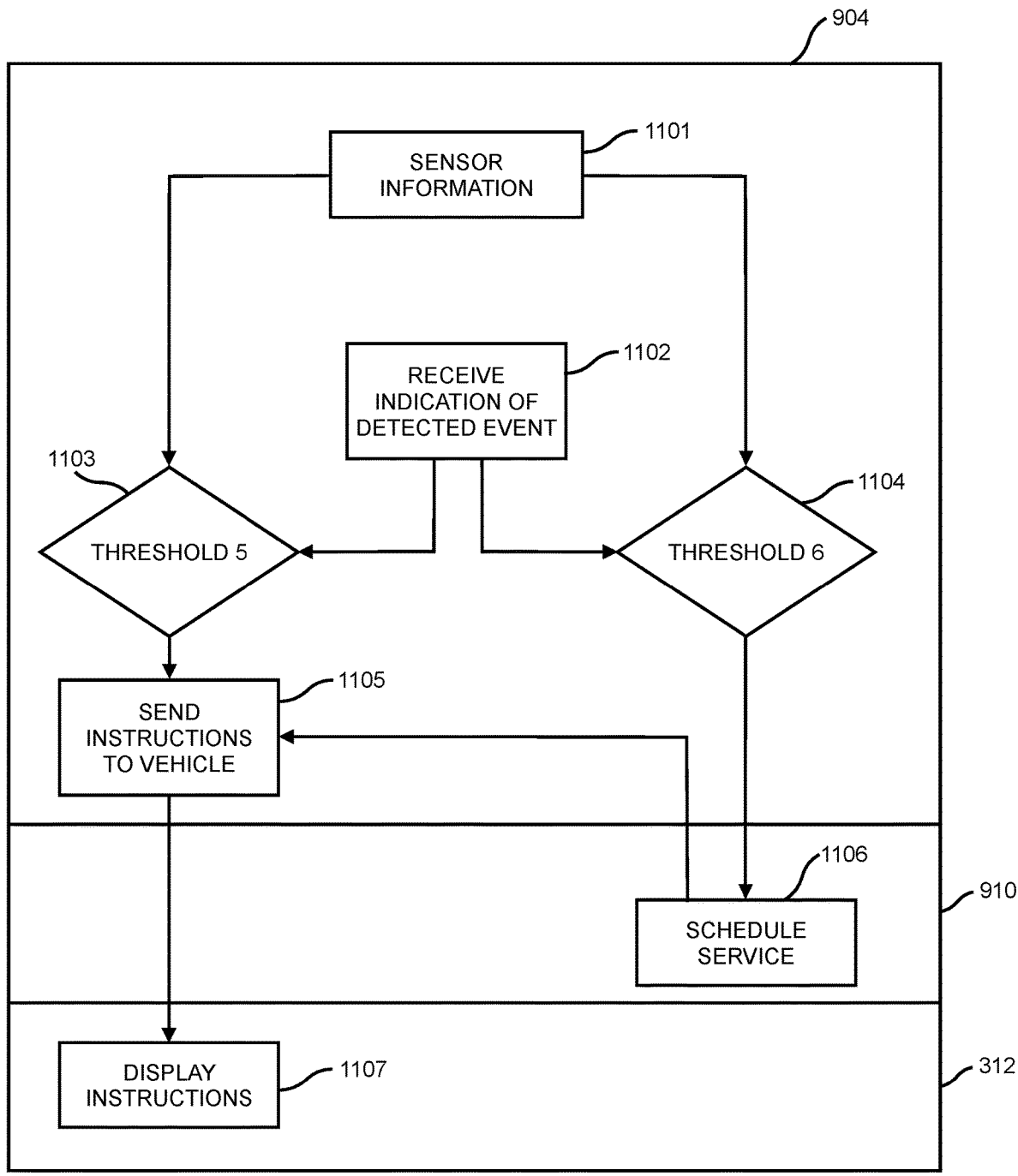
FIG. 11 is a flow chart of a method of an insurance provider system, according to an embodiment.

FIG. 11 is a flow chart of a method of an insurance provider system, according to an embodiment. In some examples, the sensor information and/or an indication of the event are received by the insurance provider (operation 1101 and operation 1102, respectively). The insurance provider may use the sensor information and/or the detected event to determine instructions (operation 1103), which may be communicated to the vehicle 100 (operation 1105). In at least one example, the insurance provider may provide the control center of the vehicle with safety instructions, e.g., to pull onto a proper shoulder of a roadway and to remain in the vehicle absent a fire condition. In another example, the insurance provider may communicate an instruction to the vehicle 100 that causes the vehicle 100 to display information about a scheduled service (operation 1107), such as an automatically called emergency service, or information about a service truck scheduled to arrive at a location of the vehicle 100. Similarly, the insurance provider may use the sensor information and/or the detected event to determine an appropriate service (operation 1104) and to automatically contact the service (operation 1106) using the dispatch module 910, wherein the service may be dispatched to the vehicle 100 without the assistance of the driver, for example. The service may be tow truck in the case of a detected event indicating a mechanical failure, an ambulance in the case of a detected event indicating an airbag deployments, for example. In at least one case, the sensor information includes the location of the vehicle 100, and the scheduled service (operation 1106) includes determining a nearest service, such as a nearest emergency crew, tow truck, or service station. In FIG. 11, threshold 5 and threshold 6 may be a same threshold, which may cause the insurance provider to schedule service (operation 1106) and send instructions to the vehicle 100 (operation 1105).

The embodiments described in this detailed description provide for the vehicle 100, which may be a connected vehicle, and the insurance provider 108 to which the vehicle 100 is connected to facilitate automatic claims processing. These elements may be supported, by appropriate computing structures and approaches, as described below.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random-access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (IPSec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:
1. A vehicle comprising:
  an engine;
  a starter;
  a sensor;
  a display;
  an indicator;
  a GPS sensor;
  a claims processing module;
  a disabling module;
  a control center comprising a processor and memory storing executable instructions that when executed by the processor causes the processor to perform the steps of:
    receiving information from the sensor and location information from the GPS sensor;
    determining that the received information exceeds a threshold and based on the determination:
      generating a classification associated with the determination;
      activating a disabling module;
      activating the indicator;
      transmitting the information, location information and classification to an insurance provider computer and to the claims processing module;
      generating a recommendation; and,
      displaying the generated recommendation on the display;

wherein the claims processing module is connected to the control center, and the claims processing module is configured to:
  receive the information, location information and classification from the control center;
  generate, based on the received information, location information, classification and the determination that the received information exceeds the threshold, a claim;
  determine an apportionment of liability based on the received information, location information and classification, and add the apportionment to the claim; and,
  send the claim with the added apportionment to the insurance provider computer; and
wherein the disabling module is connected to the control center, and the disabling module is configured to:
  disable either the engine or the starter based on the determination that the received information exceeds the threshold.

2. The vehicle of claim 1, wherein the apportionment of liability is in favor of a driver of the vehicle upon determining that an event associated with the classification is an impact on a rear-end of the vehicle and the vehicle is one of static or in a state of forward motion.

3. The vehicle of claim 1, wherein
  the sensor is a camera;
  the vehicle includes a second sensor that is an accelerometer; and
  the apportionment of liability includes an aggregation of the sensor information from the sensor and the second sensor.

4. The vehicle of claim 1, wherein the claims processing module automatically generates an estimate of a severity of an event associated with the classification and a cost to fix damage associated with the claim based on the sensor information and the location information.

5. The vehicle of claim 1, wherein the disabling module is an engine disabler.

6. The vehicle of claim 1, wherein the classification includes one or more of water damage, front-end damage, rear-end damage, airbags deployed, fire event, roll-over event, and tire air pressure lost.

7. The vehicle of claim 1, wherein the classification includes categorization into low, moderate, or high amounts of damage detected.

8. The vehicle of claim 1, further comprising a second sensor, wherein the classification includes an aggregation of the sensor information from the sensor and the second sensor.

* * * * *